United States Patent [19]
Hoenig

[11] Patent Number: 5,240,691
[45] Date of Patent: Aug. 31, 1993

[54] HIGH DENSITY CRYSTALLINE BORON PREPARED BY HOT ISOSTATIC PRESSING IN REFRACTORY METAL CONTAINERS

[75] Inventor: Clarence L. Hoenig, Livermore, Calif.

[73] Assignee: Regents of the University of California, Oakland, Calif.

[21] Appl. No.: 539,392

[22] Filed: Jun. 18, 1990

[51] Int. Cl.⁵ .................. C04B 35/64; C04B 35/56; C01B 21/06
[52] U.S. Cl. .................. 423/298; 264/56; 264/65; 419/49; 423/290; 501/96
[58] Field of Search ............ 423/290, 298; 501/96; 264/56, 65; 419/49

[56] References Cited

U.S. PATENT DOCUMENTS

| | | | |
|---|---|---|---|
| 4,381,931 | 5/1983 | Hunold et al. | 65/18.1 |
| 4,634,640 | 1/1987 | Hunold et al. | 423/290 |
| 4,952,353 | 8/1990 | Neil | 264/65 |
| 4,956,315 | 9/1990 | Mehrota et al. | 501/96 |
| 4,983,339 | 1/1991 | Boncoeur | 419/49 |

FOREIGN PATENT DOCUMENTS

| | | | |
|---|---|---|---|
| 0058618 | 8/1982 | European Pat. Off. | 423/298 |
| 0192391 | 8/1986 | European Pat. Off. | 501/96 |
| 1792696 | 7/1982 | Fed. Rep. of Germany | 423/290 |
| 2619103 | 2/1989 | France . | |
| 0166271 | 8/1985 | Japan | 501/96 |

*Primary Examiner*—Mary Wilczewski
*Assistant Examiner*—Ken Horton
*Attorney, Agent, or Firm*—Henry P. Sartorio

[57] ABSTRACT

Boron powder is hot isostatically pressed in a refractory metal container to produce a solid boron monolith with a bulk density at least 2.22 g/cc and up to or greater than 2.34 g/cc. The refractory metal container is formed of tantalum, niobium, tungsten, molybdenum or alloys thereof in the form of a canister or alternatively plasma sprayed or chemical vapor deposited onto a powder compact. Hot isostatic pressing at 1800° C. and 30 KSI (206.8 MPa) argon pressure for four hours produces a bulk density of 2.34 g/cc. Complex shapes can be made.

17 Claims, 1 Drawing Sheet

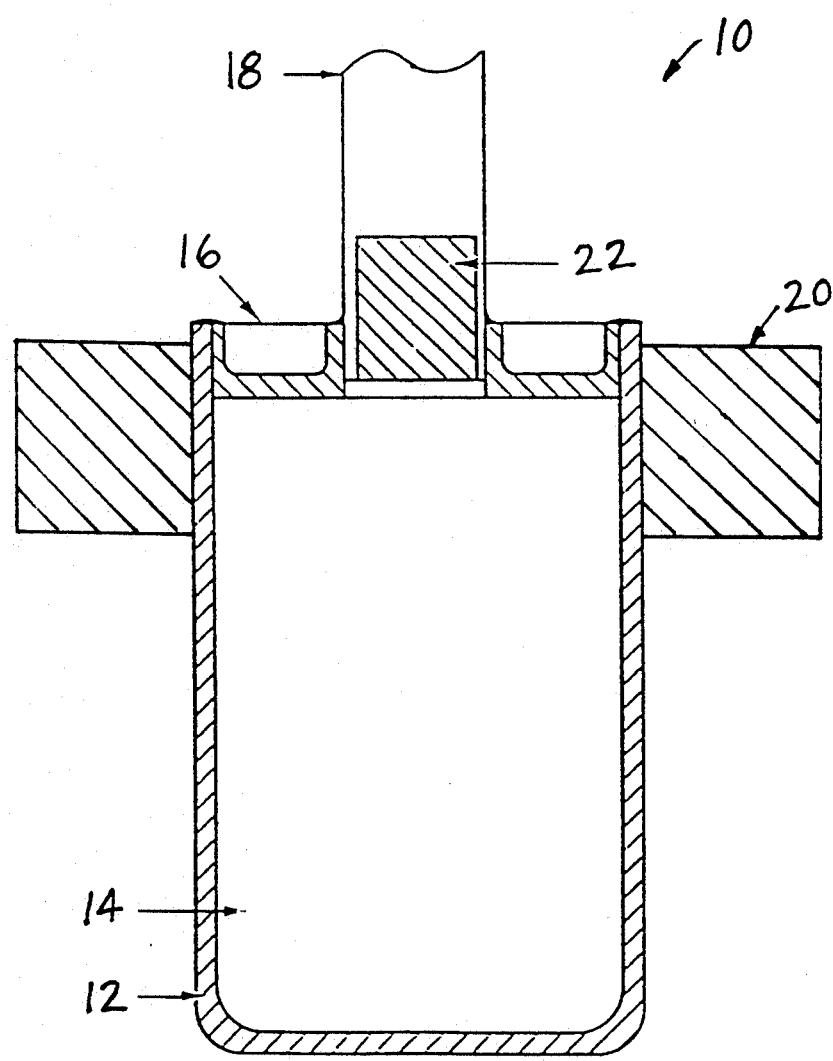

HIGH DENSITY CRYSTALLINE BORON PREPARED BY HOT ISOSTATIC PRESSING IN REFRACTORY METAL CONTAINERS

BACKGROUND OF THE INVENTION

The United States Government has rights in this invention pursuant to Contract No. W-7405-ENG-48 between the U.S. Department of Energy and the University of California for the operation of Lawrence Livermore National Laboratory.

The invention relates generally to fabrication of high density refractory materials and more particularly to the fabrication of high density crystalline boron by hot isostatic pressing.

Boron is an extremely useful material for a number of applications. Boron has a very low atomic number ($Z=5$) so it has neutronic applications in nuclear reactors as a moderater and as components in nuclear weapons. Boron also has high temperature applications and other applications because of its high specific strength. These other possible applications include automotive engines, armor, and space applications. There is also a need for large high density boron sputtering targets for use in making a variety of coatings.

However, high density solid boron monoliths have not been available in the past. Heretofore, boron has only been available as powder or in thin layers. Thus other materials such as boron carbide must be substituted in place of boron in many applications.

Solid boron monoliths cannot be made by conventional hot pressing in graphite for several reasons. A paramount obstacle is the chemical incompatability of boron and graphite. Boron will react with the graphite in a hot press to form boron carbide and this reaction will bond the boron to the graphite die and prevent removal of an integral crack-free monolith. Additionally, graphite is not strong enough for very high density hot pressing; low pressure-low strength limitations of graphite hot pressing is a major obstacle. Also conventional graphite hot pressing is unidirectional and produces a material with nonuniform properties along different axes. In addition, conventional hot pressing is not suitable for forming complex shapes. Accordingly, it would be advantageous to form solid crystalline boron by a process other than conventional graphite hot pressing.

SUMMARY OF THE INVENTION

Accordingly it is an object of the invention to provide a method for forming high density boron with isotropically uniform properties.

It is another object of the invention to provide a method for forming solid boron bodies with near full theoretical density.

It is a further object of the invention to provide high density crystalline boron monoliths.

It is another object of the invention to provide boron monoliths with a density of at least 94% of theoretical density.

It is also an object of the invention to form high density boron into complex shapes with isotropically uniform microstructure.

The invention is a method of forming high density high purity crystalline (rhombohedral) boron with isotropically uniform microstructure (uniform in all directions) by hot isostatic pressing (HIP) in refractory metal containers. The refractory metal containers are preferably formed of tantalum, niobium, tungsten, molybdenum or alloys of these metals. Commercially available boron powder is hot isostatically pressed at up to 1800° C., and up to 30KSI (206.8MPa) argon pressure for up to four hours. A hermetically sealed refractory metal canister is utilized; the starting powder is typically loaded at tap density but may also be prepressed to a higher starting density prior to HIP processing. Alternatively the container is formed by Plasma Spraying (PS), Chemical Vapor Deposition (CVD), or some other suitable coating process of the refractory metal on a boron powder compact.

The invention also includes the resulting product, hot-isostatically-pressed crystalline boron having a density of near theoretical density (2.36 g/cc) and an isotropically uniform microstructure (directionally uniform).

BRIEF DESCRIPTION OF THE DRAWINGS

In the accompanying drawings:

The FIGURE is a sectional view of a HIP can assembly.

DETAILED DESCRIPTION OF THE PREFERRED EMBODIMENTS

The invention is a method for forming high density boron and the resulting high density boron product formed thereby. Commercially available boron powder is used as the starting material. The boron powder is placed in a hermetically sealed container made of a refractory metal selected from tantalum, niobium, tungsten, molybdenum and alloys thereof. The starting powder is typically loaded at tap density. If necessary, the powder may be prepressed and preshaped. Prepressing helps facilitate loading into the containers and helps control final shrinkage. The container loaded with boron powder is then heated and evacuated (subject to vacuum) to remove any residual water vapor and other gas in order to enhance final densification. The container is then hermetically sealed and leak checked. The sealed container is hot isostatically pressed (HIP) at suitable temperature and pressure for a suitable time interval. In a preferred embodiment of the process the boron powder in a tantalum container is HIPed at 1800° C. and 30KSI (206.8MPa) argon pressure for four hours. After HIP densification the boron product is removed from the container, e.g. by machining away the container or etching or other suitable process. The container material can be salvaged and reprocessed.

In accordance with the invention a refractory canister can be utilized as the container. This type container can be evacuated prior to HIPing to improve densification. As shown in the FIGURE, a HIP can assembly 10 is made up of a tantalum or other refractory metal container 12 which is filled with boron powder 14. A tantalum or other refractory metal lid 16 which has a tantalum or other refractory metal pump out tube 18 attached thereto is welded to the top of powder filled container 12. A copper chill block 20 can be attached around the top of container 12 to act as a heat sink when lid 16 is welded to container 12. A tantalum or other refractory metal support cylinder 22 is placed in tube 18 at the attachment junction to lid 16. Cylinder 22 is a metal rod of diameter less than the diameter of tube 18 to allow the interior of container 12 to be pumped out before sealing but to protect the lid 16-tube 18 attachment joint from total collapse during the HIP process.

Container 12 is sealed by pinching off tube 18 above cylinder 22. A typical container is cylindrical, with an outer diameter of 1.5 inches, a height of 2 inches and a wall thickness of 0.062 inches (or about 3.8 cm × 5.1 cm × 1.6 mm).

However, this type canister can exhibit some mechanical disadvantages such as seams, welded joints and the like. An alternative container can be formed by either plasma spraying, chemical vapor deposition or any other suitable coating process, of the refractory metal directly onto a preformed boron powder body.

Although a typical canister or container will be cylindrical in shape, the invention can be practiced with different shaped containers. The HIP process is well suited to complex shapes. A noncylindrical canister can be loaded with powder, or a preformed Powder body of complex shape can be coated with refractory metals.

The HIP process can be carried out over a wide range of temperature, pressure and time parameters to produce a boron product with desired characteristics. A Model QIH 33 Hot Isostatic Pressing System (ABB Autoclave Systems, Inc., 3721 Corporate Drive, Columbus, Ohio 43229) capable of 2200° C. temperature and 30KSI (206.8MPa) pressure was used. A detailed illustrative processing sequence is as follows:

Step 1: After leak checking, the hermetically sealed container is placed into the HIP furnace chamber.

Step 2: The HIP chamber is evacuated and back filled with pure Argon gas at 300° C. (A pure inert atmosphere is used to prevent container and furnace oxidation).

Step 3: The temperature and pressue are then increased to up to 1800° C. and up to 30KSI (206.8MPa) at any suitable rate. A typical HIP furnace specification permits heating at 1000° C./hour. Experimentally, a rate of 1000° C./hour was used.

Step 4: Hold at up to 1800° C. and up to 30KSI (206.8MPa) for 1-4 hours.

Step 5: Cool to room temperature and one atmosphere pressure at any suitable rate. A typical HIP furnace specification permits cooling at 1000° C./hour. Experimentally, a rate of 243° C./hour was used.

Step 6: Open HIP furnace, retrieve HIP canister and remove boron.

Experimentally, powders of crystalline rhombohedral boron were HIP processed to near full density at 1500°-1800° C. and 206.8MPa for two hours. Large and small size boron powder was used. In the large category, 0.01-0.1, 0.1-1.0, 1-2 and 1-10 mm sizes were used (obtained from Herman C. Stark, Inc.); the smallest size boron was less than 37 microns (from Eagle Picher Inc.). Tap densities for all boron powders ranged from 47-58% of the theoretical value (2.36 g/cc). At 1700° C. densification was independent of particle size in the range of less than 37 microns to 10 mm; greater than 99% of theoretical density was achieved. At 1500° C., only the less than 37 micron powder reached near full density; the larger size powders reached at least 94% theoretical density. Longer hold times at the lower temperature for the larger particle sizes should yield higher densities. Boron powder less than 37 microns was also isostatically prepressed to 62% of theoretical density and then HIP processed at 1700° C./206.8MPa/2 hrs. to produce greater than 99% of theoretical density. A larger boron sample, for sputtering targets, was fabricated in a 10 cm diameter × 10 cm height tantalum can, using a combination of large size boron powders (0.01-10.0 mm) at a tap density of 62% of theoretical, by HIP processing at 1800° C. and 206.8MPa for 4 hours.

In accordance with the invention a boron product with a measured bulk density of 2.34g/cc was obtained, a material with greater than 99% of theoretical density (2.36 g/cc) for rhombohedral boron. Depending on starting particle size and HIP conditions boron material with at least about 2.22 g/cc bulk density (94% of theoretical density) is produced. The invention thus provides a heretofore unavailable high density solid boron material. Because an isostatic process is used, the material will have an isotropically uniform microstructure.

Changes and modifications in the specifically described embodiments can be carried out without departing from the scope of the invention which is intended to be limited only by the scope of the appended claims.

I claim:

1. A method of densifying crystalline boron comprising:
    placing boron powder in a refractory metal container consisting essentially of tantalum, niobium, tungsten, molybdenum or alloys thereof;
    hot isostaticaly pressing the refractory container filled with boron powder at about 1700° C. up to about 1800° C. and up to about 30KSI (206.8MPa) for a time of one hour to four hours to a boron density of from 2.22 g/cc to about 2.34 g/cc.

2. The method of claim 1 further comprising:
    forming the refractory metal container with a wall thickness of about 1.6 mm.

3. The method of claim 1 wherein the container is a refractory metal canister.

4. The method of claim 1 further comprising:
    forming the refractory metal container by coating a refractory metal onto a preformed boron powder compact.

5. The method of claim 4 wherein the step of coating is performed by plasma spraying or chemical vapor deposition.

6. The method of claim 3 wherein the canister has a noncylindrical shape.

7. The method of claim 4 further comprising forming the boron powder compact with a noncylindrical shape.

8. The method of claim 1 further comprising selecting boron powder having particle size from less than 37 microns to 10 mm.

9. The method of claim 1 wherein the step of hot isostatically pressing is performed at about 1500° C. up to about 1800° C.

10. The method of claim 1 wherein the step of hot isostatically pressing is performed at about 1700° C. up to about 1800° C. and at up to about 30KSI (206.8MPa).

11. The method of claim 10 wherein the step of hot isostatically pressing is performed for about one hour up to about four hours.

12. The method of claim 3 further comprising:
    evacuating the refractory metal container filled with boron powder and hermetically sealing the container prior to hot isostatically pressing.

13. The method of claim 1 further comprising:
    prepressing the boron powder before placing in the refractory metal container.

14. The method of claim 1 further comprising:
    removing the refractory metal container after hot isostatically pressing.

15. A method of densifying crystalline boron comprising:

placing boron powder having particle size from less than 37 microns to 10 mm in a refractory metal container consisting essentially of tantalum, niobium, tungsten, molybdenum or alloys thereof with a wall thickness of about 1.6 mm;

hot isostatically pressing the refractory container filled with boron powder at about 1700° C. up to about 1800° C. and at up to about 30KSI (206.8MPa) for about one hour up to about four hours to a boron density of from 2.22 g/cc to about 2.34 g/cc.

16. A method of densifying crystalline boron comprising:

placing boron powder in a refractory metal container consisting of a metal selected from the group consisting of tantalum, niobium, tungsten, molybdenum, and mixtures thereof; and hot isostatically pressing the refractory container filled with boron powder to a boron density of from 2.22 g/cc to about 2.34 g/cc.

17. The method of claim 16 wherein the step of hot isostatically pressing is performed for a time of one to four hours.

* * * * *